Oct. 25, 1938. D. D. GILLESPIE 2,134,474
OVEN
Filed March 30, 1935 6 Sheets-Sheet 1
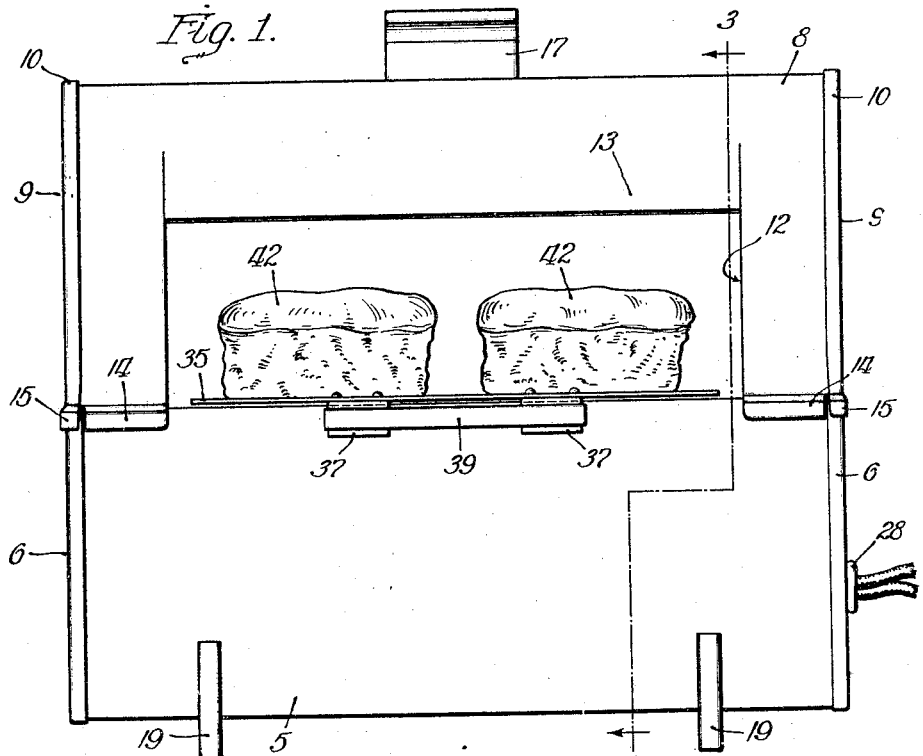
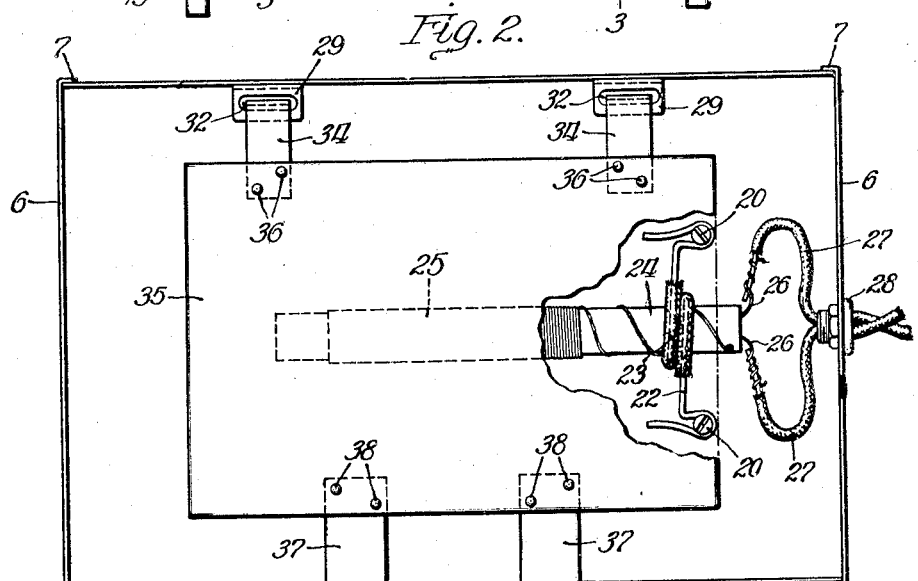
Inventor:
Durwin D. Gillespie Oct. 25, 1938. D. D. GILLESPIE 2,134,474
OVEN
Filed March 30, 1935 6 Sheets-Sheet 2

Inventor:
Durwin D. Gillespie

Oct. 25, 1938.  D. D. GILLESPIE  2,134,474
OVEN
Filed March 30, 1935   6 Sheets-Sheet 3

Inventor:
Durwin D. Gillespie
By: Mason Jackson Bottcher Henner
Attys.

Oct. 25, 1938.   D. D. GILLESPIE   2,134,474
OVEN
Filed March 30, 1935   6 Sheets-Sheet 4

Inventor:
Durwin D. Gillespie
By:
Attys.

Oct. 25, 1938.  D. D. GILLESPIE  2,134,474
OVEN
Filed March 30, 1935  6 Sheets-Sheet 5
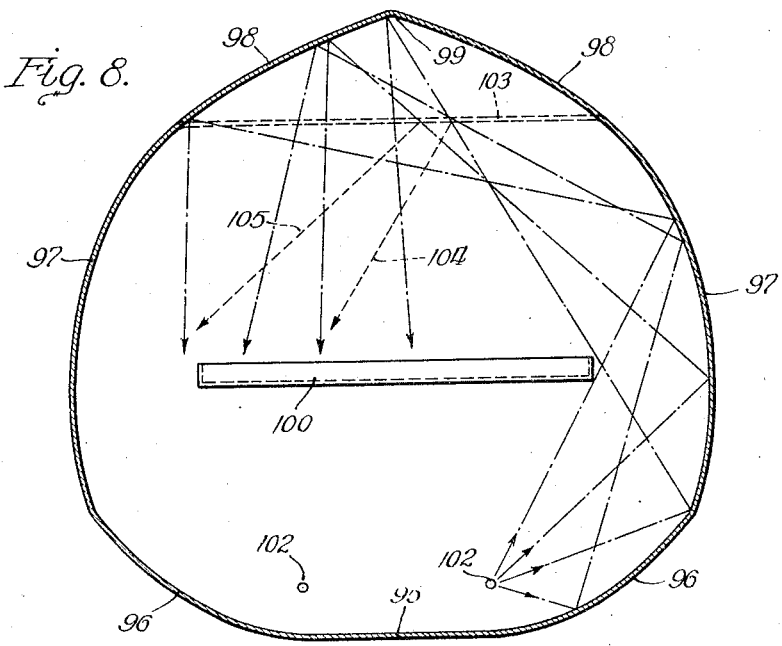
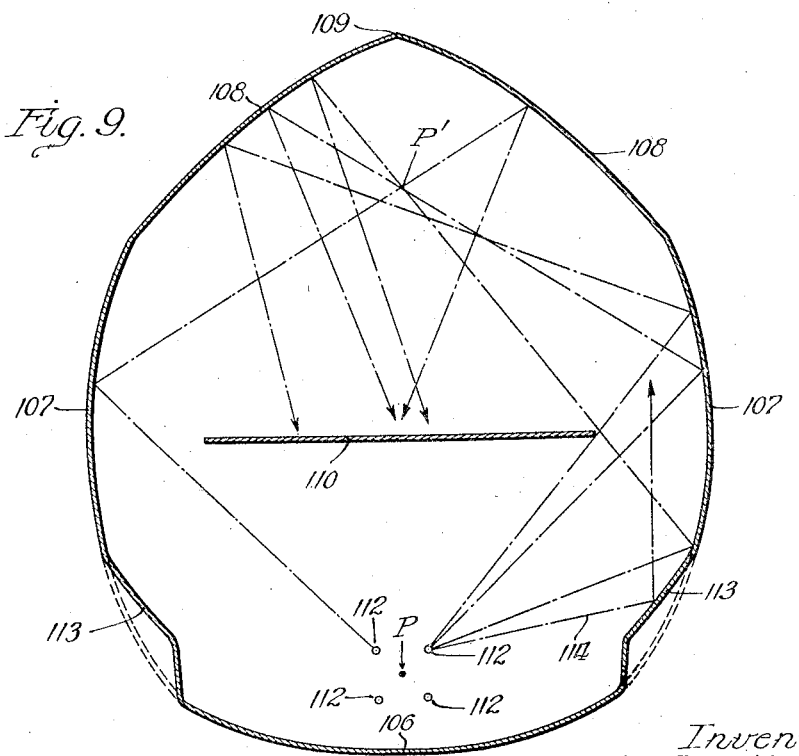
Inventor:
Durwin D. Gillespie
By: Brown Jackson Boettcher Dienner
Attys Oct. 25, 1938. D. D. GILLESPIE 2,134,474
OVEN
Filed March 30, 1935 6 Sheets-Sheet 6
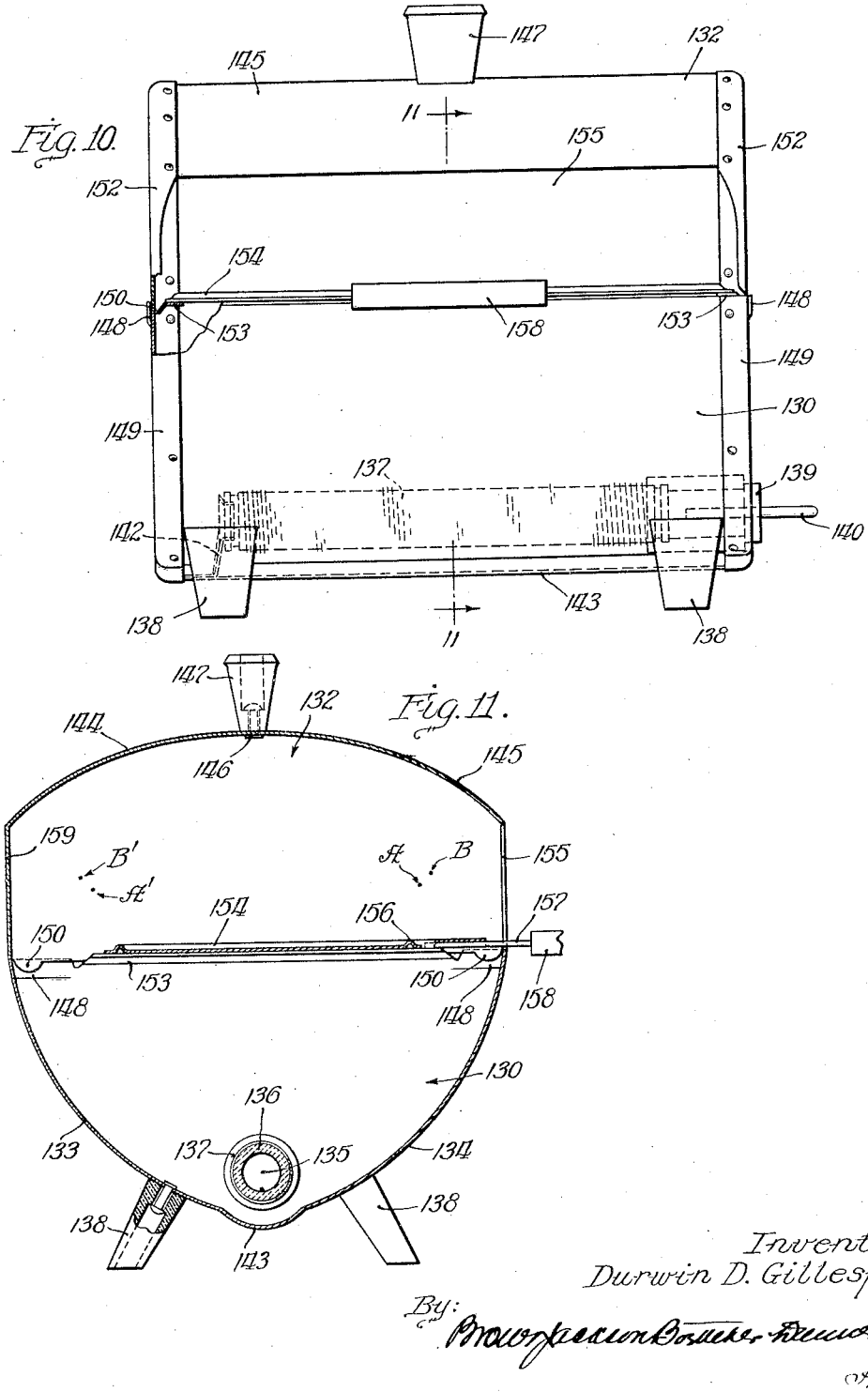
Inventor:
Durwin D. Gillespie Patented Oct. 25, 1938

2,134,474

UNITED STATES PATENT OFFICE 2,134,474

OVEN

Durwin D. Gillespie, Wilmette, Ill.

Application March 30, 1935, Serial No. 13,978

8 Claims. (Cl. 126—273)

This invention relates to ovens, and more particularly is directed to an oven of this type adapted to be used for general purposes and capable of baking small cakes, biscuits, rolls, hot cakes and similar bakery goods, eggs and other foods. The illustrated embodiment of the invention, for purposes of description, is directed to a portable table type oven, but it is not intended that the invention be so limited.

The present invention has for its primary object the provision of a compact self-contained oven of neat appearance preferably employing electrical energy for the development of heat, and so formed as to utilize to the utmost the distribution and concentration of radiant heat from an enclosed heating unit.

In baking biscuits, it is necessary that the heat applied to the tops and sides of the biscuits bear a certain definite relation to the heat applied under the biscuits. If this proportionate distribution of heat is not maintained, burning of the biscuit will occur at the overheated portion before it has been properly baked throughout its entirety. The present invention is directed to the elimination of improper application of heat to the article being baked.

Another disadvantage of the baking ovens now in use is the fact that the baking of the article cannot be readily observed, and consequently the operator must be continually opening an oven door and peering within the oven to ascertain the condition of the goods being baked.

In order to overcome these disadvantages, I propose to construct a general purpose oven in which a unique and advantageous distribution of heat to all surfaces of the goods to be baked is obtained. I further contemplate the provision of an oven of this type wherein the condition of the goods being baked is visible at all times, and removal of the baked goods can be accomplished without the necessity of opening oven doors or the like. In addition, the oven of the present invention is so constructed that a desired balance between the heating effected by radiation and that effected by conduction and convection is readily maintained.

In a preferred embodiment of the invention I provide an oven formed of differently curved surfaces, each of said surfaces being generated by a line traveling through parallel positions along a fixed curve. These surfaces form, with end closure walls, an oven chamber, and suitable means are provided for supporting a tray carrying the goods to be baked within the chamber. A suitable heating unit, such as an electrical resistance unit, may be mounted in the lower part of the chamber below the tray, and the heat therefrom is divided, a portion of the radiant rays being reflected by the walls of the chamber upwardly past the tray and then downwardly onto the article. A portion of the heat is also reflected from the lower walls of the chamber to the tray, while still another portion of the heat emanates directly from the heater into contact with the underside of the tray. The heating of the air within the chamber also causes convection currents to pass upwardly from the heater into contact with the tray.

One of the main features of the present invention is the elimination of the time lag normally present in heating up of ovens of the type now in use. This heat inertia, so to speak, is overcome by the immediate throwing of heat to all portions of the oven chamber. The provision of an opening is utilized as a means of heat control, since the heat does not accumulate in the oven in undesired quantities, the excess heat passing out of the opening. If desired, the opening can be provided with an adjustable closure, suitably calibrated in degrees, to control desired baking temperatures. The area of the opening itself may be varied in different types of ovens for this same purpose.

By properly determining the curvature of the oven surfaces, the position of the heating unit within the chamber and the size of the tray, any desired distribution of heat may be produced, and the oven may be thereby constructed so that even and properly controlled baking of the goods on the tray can be accomplished.

Another object of the present invention is the provision of a combination of variously curved surfaces constituting the oven chamber, whereby any desired heat transmission to various portions of the chamber or oven may be attained.

I also provide novel means for supporting the tray within the oven and facilitating its removal therefrom. Thus the chamber is provided with a lateral opening, through which the baking of the goods is visible, and through which the tray may be removed when the baking has been completed.

Other objects and advantages of the present invention will appear more fully from the following detailed description, which, taken in connection with the accompanying drawings, will disclose to those skilled in the art the particular construction and operation of a preferred form of the present invention.

In the drawings:

Figure 1 is a front elevational view of one form of baking oven;

Figure 2 is a top view, partially broken away, of the lower portion of the oven shown in Figure 1;

Figure 8 is another diagrammatic form of a modified oven construction;

Figure 9 is a diagrammatic sectional view of a still further modified type of oven;

Figure 10 is a front elevational view of a preferred form of the present invention;

Figure 11 is a vertical sectional view taken substantially on line 11—11 of Figure 10.

Figure 3:
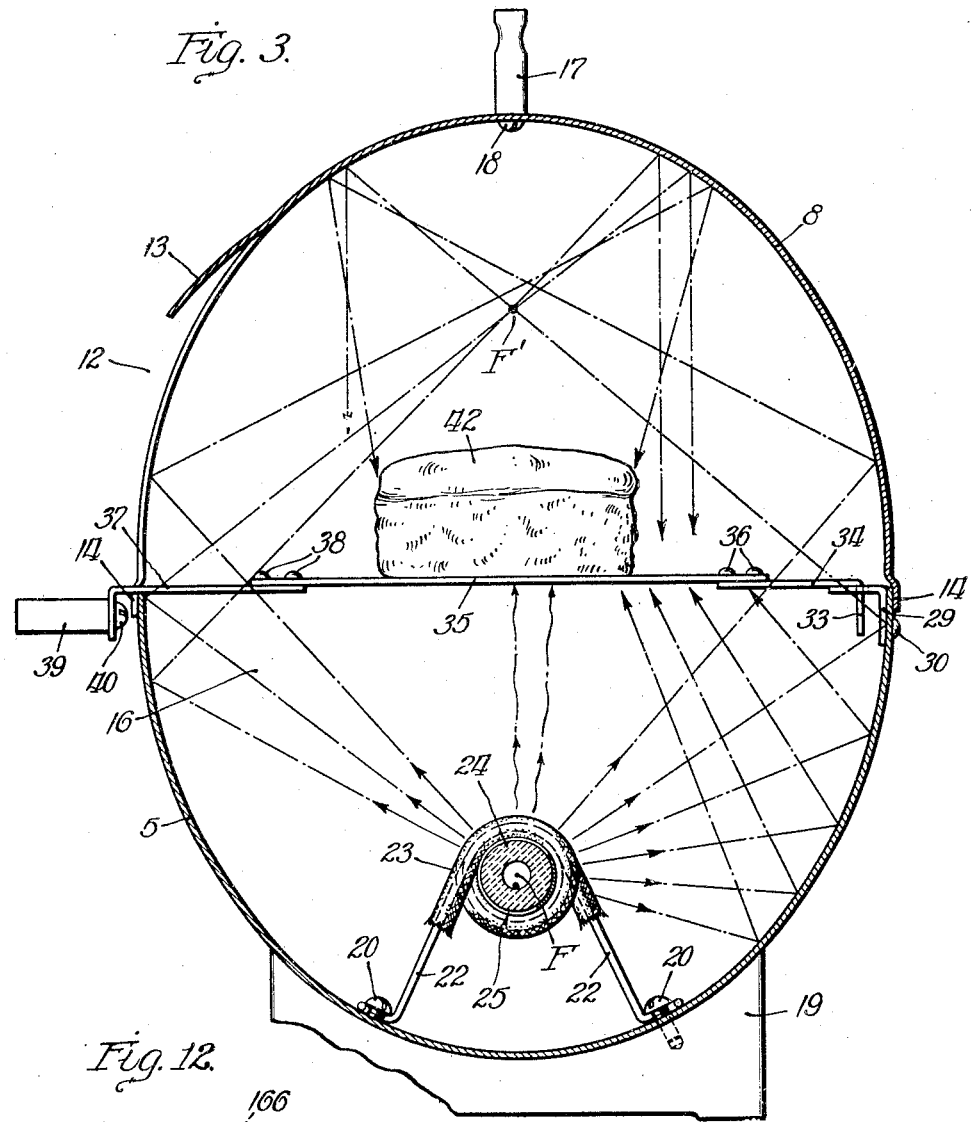
Figure 3 is a vertical sectional view of the oven shown in Figure 1, taken substantially on line 3—3 of Figure 1.

Referring now in detail to the construction shown in Figures 1 to 3, inclusive, the oven comprises a lower shell member 5, comprising a substantially semi-elliptical surface or cylinder formed by a line moving through parallel positions along an elliptical curve, which chamber 5 is provided, at its opposite ends, with upwardly extending end portions 6 having normally extending peripheral flanges 7 engaging over the defining peripheral edge of the shell 5 to close the same, forming an elliptical trough.

The upper portion of the baking oven comprises a second shell member 8, comprising a surface generated by a line moving through parallel positions about a parabolic curve, which shell member 8 is provided, at its end portions with closure members 9 having normally extending peripheral flanges 10 engaging over the peripheral edges of the shell 8. The shell 8 is provided, at the forward portion thereof, as viewed in Figure 1, with a cutout opening 12, and the upper defining edge of the opening 12 is pressed slightly outwardly as shown at 13 in Figures 1 and 3.

The lower defining portions of the shell 8 and members 9 are offset outwardly to form flange portions 14 and 15, respectively, fitting over the upper peripheral edge of the lower shell 5, whereby the upper shell 8 is mounted in alined position over the lower shell to form an oven chamber indicated generally at 16 in Figure 3.

The upper shell 8 is provided with a handle portion 17, preferably formed of a molded phenol condensation product, hard rubber or the like, which will not be rapidly heated by contact with the metallic shell 8, and which is secured in fixed position at the upper portion of the shell 8 by means of a screw or screws 18.

The lower shell member 5 is preferably supported upon a table or other supporting surface by means of a pair of spaced bracket members or foot portions 19, formed of hard rubber or other suitable insulating material, the upper surface of the foot portions 19 being rounded out to conform to the outer peripheral surface of the lower portion of the shell member 5. The foot portions 19 are each secured in position by means of a pair of screw members 20 threaded angularly thereinto as shown in Figure 3, the screw members 20 also serving to provide anchoring means for supporting members 22 comprising adjustable members provided with suitable heat insulating material, such as asbestos, shown at 23, wrapped around the core 24 of an electrical heating or resistance unit shown generally at 25. The unit 25 is connected through end conductors 26 to suitable power conductors 27 leading through the bushing 28 to any suitable source of current or power supply. The bushing 28, if desired, can be made in the form of a receptacle plug adapted to receive the contact prongs of a contact plug connected to any suitable source of current.

At the upper edge of the rear portion of the shell 5 I provide a pair of angle bracket members 29, secured to the shell 5 by means of rivets 30, which angle members are provided, in their horizontally extending leg portions, with suitable apertures 32 receiving the downwardly extending ends 33 of a pair of angle bracket members 34 secured to the rear portion of a supporting tray 35 by means of rivets 36.

The tray 35 is substantially rectangular in shape, and is of an area considerably less than the cross sectional area across the upper surface of the shell 5. At its forward side, the tray 35 is provided with a pair of extending tab members 37, secured thereto by rivets 38, although it is to be understood that both the tab members 37 and the bracket members 34 may be formed integrally with the tray 35, if desired.

The forward ends of the tab members 37 are adapted to support therebetween an insulating handle member 39, formed of any desired heat insulating material, which is secured thereto by means of the screws 40. The tab members and handle 39 extend outwardly of the oven chamber 16 through the opening 12 formed in the forward surface of the shell member 8. Any suitable or desired food stuff which it is desired to bake may be placed upon the tray 35, and in Figures 1 and 3 I have disclosed bakery goods such as muffins or biscuits 42 upon the tray 35.

Referring now in more detail to the structure of the oven shown in Figure 3, it is to be pointed out that the heating unit 25 is preferably positioned at the focus of the surface of shell 5 by means of the supporting members 22. Since the surface 5 is elliptical in form, it is apparent that the heat rays emanating from the unit 25 will be reflected from the interior surface of the shell 5 in the manner shown by the arrows in Figure 3. These rays tend to converge at the focal point of the opposite focus of the ellipse of which shell 5 forms a portion, and therefore it is desirable to place the focus of the parabolic surface of the shell member 8 in a position corresponding to the second focus of the elliptical surface formed by shell 5. The focus F of shell 5 therefore forms the center of the core 24 of the heating unit 25, and it will be noted that the radiant heat rays from the unit 25 passing beyond the front and rear edges of the tray 35 will be reflected from the parabolic surface of the shell 8 through or adjacent the focus F', whereby these rays will be reflected again from the interior surface of the shell 8 downwardly toward the tray 35.

Certain of the rays do not pass through the focus F' of the shell 8, and some of these rays tend to converge inwardly upon the bakery goods 42, the other rays passing in substantially parallel relation downwardly about the bakery goods and against the upper surface of the tray 35, providing for controlled heating, by radiation and reflection over substantially the entire surface of the bakery goods 42.

A portion of the heat from the unit 25 is radiated directly upwardly against the tray 35, being a direct emanation of radiant heat from the unit 25 to the tray, without any reflection from the elliptical surface of the shell 5. Other rays from the unit 25 will be reflected against the surface of the shell 5, but will converge against the tray 35, since they are not at such an angle as to be reflected past the front or rear edges of the tray.

In addition, a certain amount of the heat generated by the unit 25 will travel upwardly against the bottom of the tray 35 due to convection currents caused by heating of the air. The same is true of the openings at the front and rear of the tray, whereby a portion of the heat will be convected therethrough by air streams passing into the upper portion of the oven chamber 16, within the shell 8, where it will become pocketed substantially at the top of the shell and will then extend downwardly toward the bakery goods 42.

By properly defining the front and rear surfaces of the tray 35, and the proper positioning of the heating unit 25 with respect to the focal center of the lower elliptical surface, it is apparent that proper proportioning of the heat between the lower surface of the goods being baked and the lateral and upper surfaces thereof can be attained. If it is desired to have the rays converge more sharply upon the upper surface of the bakery goods, then the focal point F' of the parabolic surface 8 can be raised slightly by extending the peripheral defining edges of this surface to raise the member 8 a sufficient distance above the tray so that the rays when being reflected from this surface will converge onto the upper surface of the bakery goods 42, or this may be attained by varying the curvature of the surface 8 in any desired manner.

If it is desired to vary the manner in which the portions of heat emanated by the unit 25 can be distributed throughout the oven chamber, it is only necessary to raise or lower the spacing of the unit 25 with respect to the focal center of the elliptical surface formed by shell 5; to raise or lower the focal center of the parabolic shell 8; or to vary the lateral extent of the supporting tray. Any one of these variations will result in a different apportionment of heat between the upper and lower chambers and onto the bakery goods. All of the factors can be varied, if desired, or only one factor need be varied to provide for a change in the apportionment of heat to the upper and lower surfaces of the tray 35. The heating unit 25 can be adjusted by bending the diagonal leg portions of the supporting members 22; or by the substitution of other supporting members 22 of different heights; or by the use of adjustable supporting devices of the construction shown in Figure 13, which I shall later describe. In this manner, the heating unit 25 can be raised or lowered with respect to the focal point F, thereby allowing for a redistribution of the heat distributed throughout the oven chamber 16.

The lateral opening 12 in the upper shell 8 does not provide for any material loss of heat outwardly of the oven, inasmuch as it is formed in a lateral surface of the oven, and the heat caused by convection will rise upwardly and be trapped in the upper closed portion of the shell 8, and will not escape from the opening 12 until it has been built up to an extent providing a substantially constant heat cushion above the material being baked.

It is obvious that the present invention may be employed for toasting bread, cakes or the like, as well as for baking, and it is to be understood that I do not intend to limit the same only to the baking of articles in the oven, since it is within the scope of this invention to provide for toasting of bread or meat.

Figure 4:
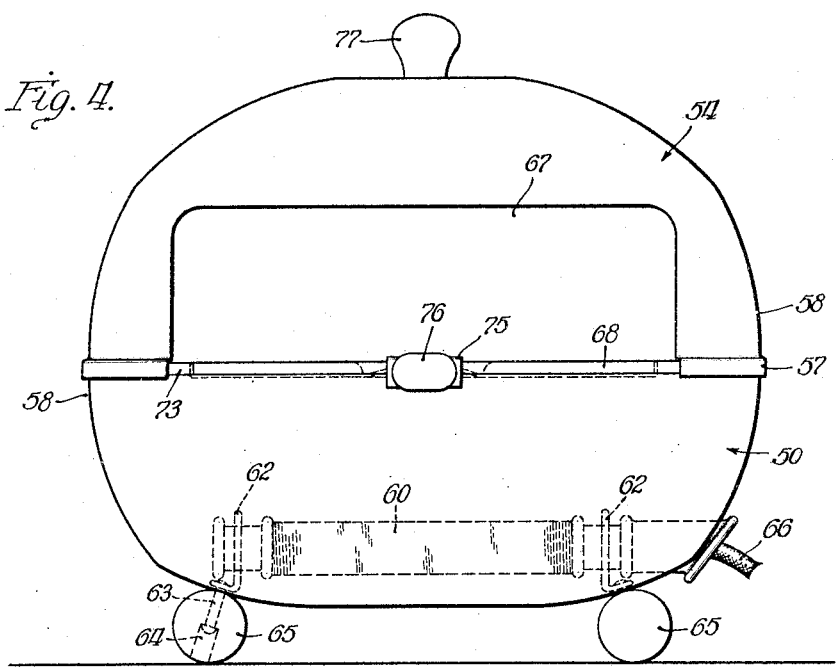
Figure 4 is a front elevational view of a modified form of oven.
Figure 5:
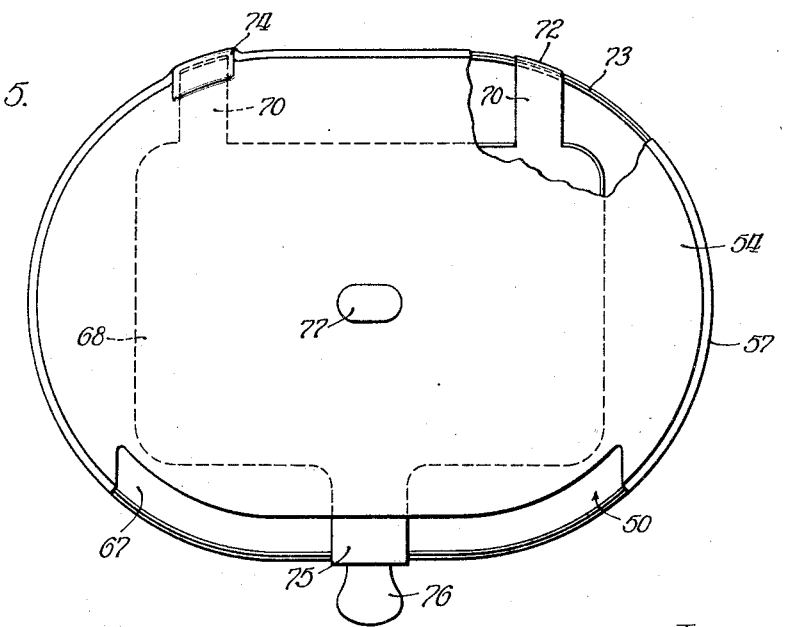
Figure 5 is a top elevational view of the oven shown in Figure 4, with a portion thereof broken away.
Figure 6:
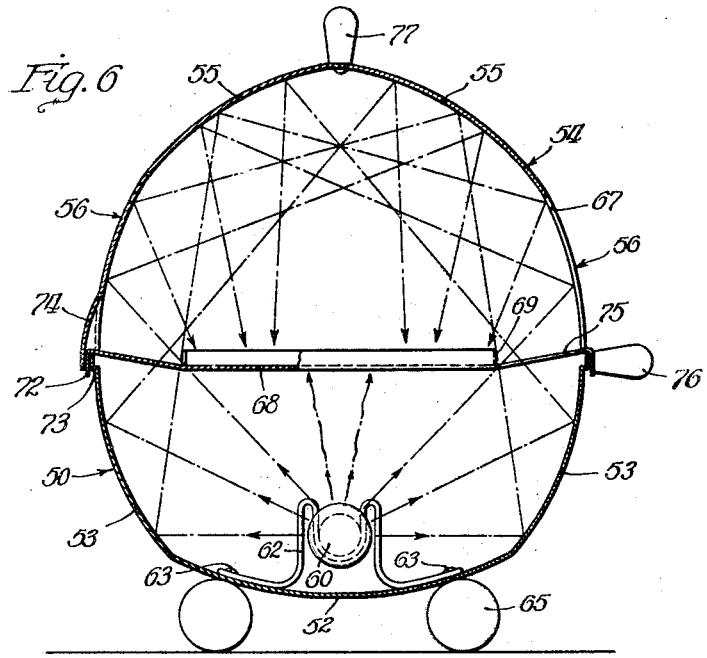
Figure 6 is a vertical sectional view of the oven shown in Figure 4.

In the embodiment of the invention shown in Figures 4, 5 and 6, I have provided a slightly modified form of baking oven, in which the lower shell 50 is composed of three generated surfaces, having its base portion formed as a parabolic surface 52, and having its two side wall portions formed as elliptical surfaces indicated at 53.

The upper shell of the baking oven is shown at 54, and is composed of two parabolic portions 55 which merge into two elliptical portions 56 forming the lower lateral defining portion of this shell.

The upper shell 54 is provided with an annularly flanged peripheral portion 57 fitting over the upper peripheral edge of the lower shell 50. The end portions of the shells 50 and 54 form curved sections indicated in Figure 4 by the numeral 58, whereby the entire baking oven shown in this embodiment of the invention is substantially in the form of an oblate spheroid.

Disposed within the lower shell 50 I provide the heating unit 60, corresponding to the heating unit 25 of the embodiment shown in Figures 1 to 3, which is supported within the shell 50 and spaced from the bottom thereof by means of a pair of supports 62 secured adjacent the base to threaded studs 63 which extend into counterbored openings 64 formed in substantially spherical foot portions 65. The heater unit 60 comprises a closely wound electrical resistance wire supported on a central core, and energized by means of electric current passing through the conductor cable 66.

The top half 54 of the oven is provided, at its forward end, with a cutout opening 67 in the lateral surface thereof, which opening provides for removing a tray 68 from the interior of the oven. The tray 68 comprises a flat plate having a normally extending peripheral flange 69, with rearwardly extending leg portions 70 having downwardly extending ends 72 engaging between a peripheral flange 73 formed on the upper end of the shell 50, and an extruded portion 74 formed at the rear and lower peripheral surface of the top shell member 54.

At its forward end, the tray 68 has an extending tab portion 75 having an insulating handle 76 mounted thereon, as shown in detail in Figure 6. The top shell 54 at its upper central portion has a heat insulating handle member 77 provided for the purpose of facilitating the removal of the upper half of the shell from the lower shell 50 when it is desired to open the oven.

Referring now in detail to the manner in which heat is applied to the material to be baked upon the tray 68, in Figure 6 I have disclosed, by means of dot and dash lines, the manner in which the heat generated by the unit 60 is transmitted to all parts of the oven. The lower surface of the tray 68 is adapted to receive radiant heat from the heater unit 60 directly, this radiant heat being augmented by a certain amount of heat conducted to the lower surface of the tray by convection currents of heated air rising from the unit 60. In addition, a considerable number of the heat rays emanating from the unit 60 are reflected from the surfaces 53 and 56 past the rear and front surfaces of the tray 68 and are again reflected from the surfaces 55 downwardly onto the tray 68, as shown in the dot and dash lines in Figure 6. By properly proportioning the size of the tray 68 with respect to its front and rear defining surfaces, and by the proper supporting of the member 60 in position within the lower portion of the shell, the amount of heat transmitted past the edges of the tray and reflected from the upper internal surface of the shell 54 can be increased or decreased as desired with respect to the amount of heat directly transmitted from the unit 60 to the bottom of the tray 68. In this manner, the proper proportions of heat to the material being baked upon the tray can be controlled, either by varying the size of the tray, or by varying the position of the unit 60 within the shell 50.

Figure 7:
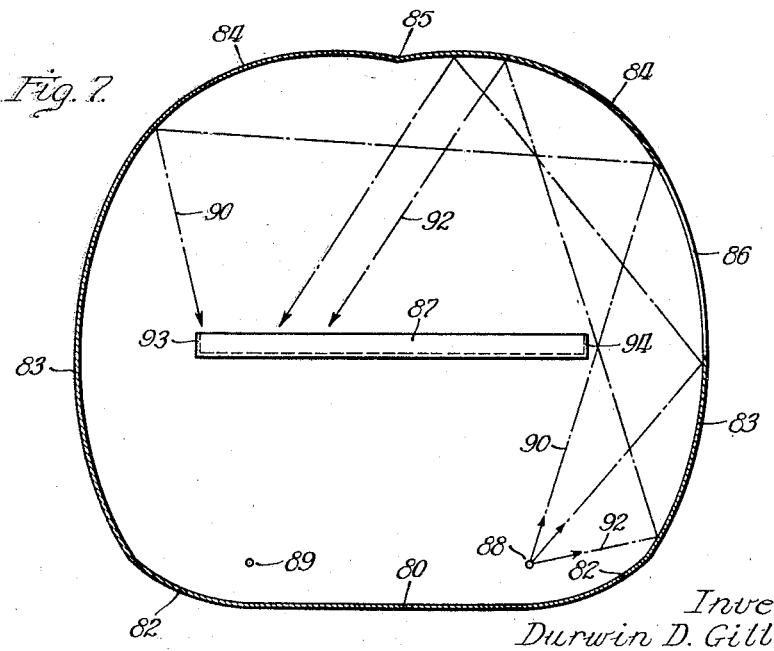
Figure 7 is a diagrammatic fragmentary view of a modified form of oven construction.

In Figures 7, 8 and 9, I have disclosed diagrammatic sectional views through modified forms of baking ovens, showing different manners in which the surfaces may be formed to provide for proper proportionate reflection of heat onto the upper and lower surfaces of a tray supporting the material to be baked or toasted.

Referring to Figure 7, I have disclosed a baking oven having a lower flat surface 80, two parabolic portions 82 joined to the opposite sides thereof, with the parabolic surfaces 82 merging into two elliptical surfaces 83 extending upwardly and forming the lateral defining walls of the oven. At their upper ends, the elliptical surfaces 83 merge into parabolic surfaces 84 which are joined as at 85 to form a slight depression in the upper surface of the oven. A suitable opening 86 is formed in one lateral surface of one of the elliptical surfaces 83, and I have diagrammatically disclosed a supporting tray 87 within the oven chamber. In the lower portion of the oven chamber I have disclosed two heating units, 88 and 89, which are spaced laterally from each other and upwardly from the lower surface 80 of the oven, being vertically disposed approximately above the juncture of the parabolic surfaces 82 and the lateral defining edges of the surface 80. Since the oven chamber is symmetrical about a central vertical plane, I have disclosed the heat rays emanating only from the unit 88 in their respective dot and dash lines, showing the manner in which the heat from one of these units is reflected down onto the tray 87. It is obvious that the heat rays emanating from the unit 89 will be reflected in the same manner upon the opposite defining surfaces of the chamber. In addition, a considerable proportion of the heat from the units 88 and 89 will be directed against the undersurface of the tray 87 as radiant heat rays emanating directly from the units.

It is apparent that all heat rays between the rays indicated at 90, and at 92, will be reflected from the elliptical surface 83 to one or the other of the parabolic surfaces 84, and then will be reflected downwardly onto the tray 87. A similar reflection of heat rays will occur from the unit 89.

In addition, convection currents will cause a certain amount of heat to be transmitted upwardly from each of the units to the tray. By properly selecting the radii of curvature or the focii of the various surfaces, it is apparent that any desired proportion of the heat generated by each of the units 88 and 89 may be transmitted upwardly past the defining edges 93 and 94 of the tray 87, to provide for a reflection of a predetermined proportion of the heat from each of the units onto the top of the tray, whereby the heat transmitted to the bottom and to the top of the material to be baked or toasted can be accurately proportioned.

In Figure 8 I have disclosed another diagrammatic sectional view of an oven chamber, having a flat floor surface 95, the lateral edges of which merge into two parabolic upwardly extending surfaces 96, which are then joined to two elliptical surfaces 97 forming the lateral sidewalls of the chamber, the two elliptical surfaces 97 having joined thereto two parabolic surfaces 98 which are joined at 99 to provide a substantially peaked juncture point. A tray 100 is disposed within the oven chamber, and a pair of laterally spaced heating units 102 are provided, which are spaced upwardly above the lower surface 95 of the chamber. The structure in Figure 8 is somewhat similar to that shown in Figure 7, except that the parabolic surfaces 98 have been substituted for the parabolic surfaces 84 of the structure shown in Figure 7. The heat rays emanating from either one of the units 102 will be reflected in substantially the manner shown in the dot and dash lines in Figure 8, being initially reflected from either the parabolic surfaces 96 or elliptical surfaces 97 into contact with the surfaces 98, and being then reflected downwardly onto the tray 100. Of course, a certain amount of the heat will be directed as radiant heat from the units 102 directly against the under surface of the tray 100.

In Figure 9 I have provided a slight modification of the structure shown in Figure 8, the oven section diagrammatically shown in this later embodiment being provided with a parabolic lower surface 106, having joined thereto the elliptical surfaces 107 forming the lateral sidewalls of the chamber, the surfaces 107 merging, at their upper edges, into the two complementary parabolic surfaces 108, which are joined at 109. A tray 110 is diagrammatically shown within the oven chamber, and the oven may be supported in any desired manner upon a supporting surface.

In the embodiment shown in Figure 9, I have provided a heating unit, which may, for purposes of discussion, be considered as a plurality of spaced concentrated heat radiating points or surfaces 112, spaced equidistantly about the focal point P of the elliptical sections 107, and the rays emanating from the points 112 and extending radially outwardly from the focal point P will pass through the second focus of the ellipse in the upper part of the oven chamber, shown at P'.

As shown by the dot and dash lines in Figure 9, the rays from the spaced points 112 will be reflected outwardly past the defining edges of the tray 110, and will then be reflected downwardly from the parabolic surfaces 108 onto the tray, radiant heat from the points 112 being directed upwardly against the lower surface of the tray. If desired, the elliptical surfaces 107 may have portions 113 thereof pressed inwardly as shown in Figure 9, whereby a portion of the rays emanating from the points 112 will be thrown directly upwardly, as shown by the dot and dash line 114, past the side walls of the tray, and will then be reflected from the parabolic surfaces 108 onto the tray surface. By pressing in the lower portions of the elliptical surfaces 107 as shown at 113, a greater number of the rays from the points 112 will be deflected upwardly past the edges of the tray, and consequently the proportionate amount of heat transmitted to the upper portion of the oven chamber can be increased. In this manner, that is, either by the varying of the width of the tray, or by pressing in the lower portions of the elliptical surfaces 107, the proportionate amount of heat distributed on opposite sides of the tray can be accurately controlled. This is true of all embodiments of the invention.

In the preferred embodiment of the invention illustrated in Figures 10 and 11, the baking oven is formed in two sections, comprising a lower section 130 and an upper section 132.

The lower section 130 comprises two elliptical surfaces 133 and 134, the lower focal points of the ellipses 133 and 134 being coincident at the point 135, which forms the axis of an insulating core 136 upon which an electrical heating unit 137 is mounted. It is therefore apparent that the heating unit 137 is mounted at the common focal point of the two elliptical surfaces 133 and 134.

The lower section 130 of the oven is supported upon any suitable supporting surface by insulating legs 138, suitably secured in any desired manner to the lower surface of the portion 130 of the oven. The heating unit 137 is connected, through the bushing 139, to any suitable source of supply, having contact prongs 140 extending outwardly of the oven for connection to any suitable contact plug connected to a source of supply. At its opposite end, the heating unit 137 is suitably supported by means of supporting members 142 above the lower surface of the member 130. A substantially cylindrical surface 143 is joined to the lower ends of the surfaces 133 and 134 to provide a sufficient air space about the heating unit 137 to provide for free circulation of air thereabout, and also to prevent overheating of the supporting surface upon which the legs 138 are adapted to rest, and also to reduce the rate of deterioration of the reflecting surface of the shell by reducing the maximum temperature of the shell under the heating element.

The upper portion of the oven, indicated at 132, comprises two parabolic surfaces 144 and 145, which are joined together as at 146, this junction point also serving as a suitable support for an insulated handle member 147, whereby the upper half 132 of the oven may be removed from the lower half thereof.

The upper focal centers of the elliptical surfaces 133 and 134 are indicated at B' and B, respectively. However, the elliptical surfaces extend only up to the junction between the top portion 132 and the lower portion 130 of the oven.

The portion 132 is supported on the lower portion 130 by providing outwardly offset peripheral edges 148 at the upper ends of the side walls 149 of the lower shell 130, which are adapted to receive downwardly extending tongues 150 carried by the side walls 152, closing the ends of the trough formed by the surfaces 144 and 145. This prevents relative movement between the two shells. The upper ends of the closure members 149 are also provided with inwardly extending flange portions 153, which provide supporting surfaces for the lateral edges of a tray member 154, which has sliding movement into and out of the opening 155 formed below the lower end of the parabolic surface 145. The side walls 149 and 152 are flanged and joined to the shells 130 and 132 in any desired manner.

The tray 154 is provided with a peripheral bead 156 defining the tray surface proper, and is also provided with a pair of extending tongue portions 157 adapted to support an insulating handle 158 at the forward end thereof outwardly of the opening 155.

The tray 154 therefore has lateral sliding movement into and out of the opening 155, and is so disposed as to leave an elongated rectangular opening at the rear end thereof between the inner surface of the upper end of the elliptical surface 133 and the rear defining edge of the tray 154.

The lower end of the parabolic surface 144 is provided with a depending substantially planar surface 159, which is adapted to have seating engagement against the upper edge of the elliptical surface 133. The focal points of the parabolic surfaces 144 and 145 are indicated at A' and A, respectively. It will be noted that the focal points of the parabolic surfaces are offset slightly with respect to the upper focal points of the elliptical surfaces 133 and 134. This displacement of the upper focal points A' and A from the focal points B' and B, provides for spraying or dispersion of the radiated rays emanating from the heater unit 137 and reflected from the surfaces 133 and 134 upwardly past the lateral edges of the tray to the parabolic surfaces 144 and 145, whereby the reflected rays are sprayed over the upper surface of the tray, thereby providing an even distribution of heat upon the material being baked upon the tray.

In order to prevent pocketing of heat adjacent the rear of the tray 154, the surface 159 is made substantially planar, whereby the surface 159 forms, in effect, practically no part of the radiating surface for directing heat upon the upper surface of the material being baked upon the tray. This compensation is desirable in order to prevent overheating of the portion of the material at the rear of the tray, inasmuch as the opening 155 at the front of the oven prevents radiation of the heat from that portion of the oven onto the material on the tray.

The displacement of the parabolic focal points A' and A from the corresponding upper focal points B' and B of the elliptical surfaces may be varied as desired, to produce any desired dispersion or spraying of the rays reflected from the surfaces 133 and 134 off of the surfaces 144 and 145 onto the tray. The variation of the displacement of these focal points result in varying of the amount of heat concentrated upon the upper surface of the tray. Of course, it will be obvious that a certain proportionate amount of heat emanating from the unit 137 will be directed upwardly against the lower surface of the tray 154 in the usual manner.

I have found that a tray formed of aluminum, of stainless steel, or of chromium plated steel, provides the best results, since it does not develop localized hot spots. Further control is attained by the selection of the finish of the tray surface.

It is to be understood that the heating unit 137 may be adjusted vertically, if desired, in order to provide for variation in the amount of heat reflected upwardly past the tray, and the amount of heat retained and directed against the under side of the tray. The positioning of the tray within the oven will also produce variations in the distribution of heat to opposite sides of the tray.

Figure 12:
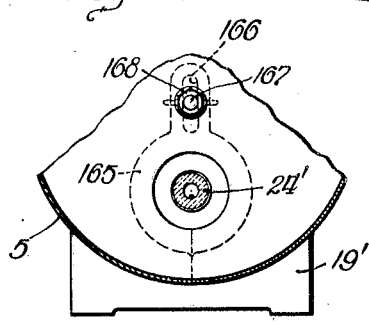
Figure 12 is a detailed view of an adjustable mounting for the heater unit.

Referring now to Figure 12, I have illustrated therein a modified manner in which the position of the heater units may be varied. In this embodiment of the invention, the core of the heater unit 24', corresponding to the core 24 of Figure 3, is carried within a suitable stirrup or bracket 165, which is provided with a slotted portion 166 engaged by a suitable bolt member 167 having securing means 168 carried thereon. By relieving the frictional clamping engagement between the securing means 168 and the defining edges of the slot 166, the bracket 165 may be moved vertically upwardly or downwardly, and may be rotated laterally about the member 167, thereby providing for adjustable positioning of the core 24' of the heating unit. This unit may be disposed within a lower shell, such as the shell 5' of an oven supported by the supporting legs 19' upon any suitable supporting surface.

It is obvious that any other desired manner of adjusting the supports may be provided, such as a providing slots in the leg portions 22 of the straps supporting the heater unit 25 of Figure 3, with clamping members for adjustably positioning the slotted portions toward or away from each other.

The ovens described in the various embodiments of my invention are of relatively small size, and neat appearance, and can be readily maintained clean and sanitary. In additon, the insulating foot portions thereof which support the oven upon a table surface serve to insulate the oven from the surface, so that no damage can be incurred by table surfaces due to the heat within the oven. Also, the top portions of the ovens are provided with insulating handles whereby the ovens can be opened, if desired.

The trays being removable, they may be withdrawn from the oven, the material which has been baked removed therefrom, and fresh material to be baked placed thereon, after which the trays may be replaced in the oven for baking. The heating units may have receptacle plugs providing for direct connection at the oven of a flexible conductor or cable cord thereto, or may be provided with an extension cord extending from the unit outwardly to connection at any suitable wall outlet or other electrical supply source.

As far as the composition of the reflecting surfaces is concerned, any desired metallic reflecting surface can be employed. I have found, in practice, that best results can be obtained by the use of an aluminum surface provided with a suitable finish, which provides for reflection of the greater portion of the heat rays coming in contact therewith. Silvered glass will give a reflection of approximately 82%, while chromium or porcelain enamel will give a reflection of approximately 65%. Nickel gives somewhere around 60% reflection, while stainless steel I have found, will give approximately 55% reflection.

It is therefore obvious, that by providing the desired type of reflecting surface, a desired or proportionate amount of reflected heat may be made available within the oven for the desired purpose. The surfaces are so chosen as to avoid localized hot spots withint he oven chamber and to control the rate of absorption of heat within the oven.

While radiant heat from an electric resistance unit has been described in connection with the present disclosure, it is to be understood that equivalent sources of radiant heat may be employed. Also, by the provision of an open door, the control of humidity of the baking process may be attained without the use of forced drafts or the like. This latter feature is especially important in connection with baking of enamel finishes and the like, where the vaporized solvents should be removed.

It is to be understood that the specific structures shown and described in the present specification are for purposes of illustration only, as the fundamental principle of providing a heating unit wherein the proportionate amount of heat transmitted to the upper and lower surfaces of the material to be baked or toasted can be accurately controlled, is capable of embodiment in a wide variety of structures.

I therefore do not intend to be limited to the particular shapes and structures described herein, but only in so far as they disclose means for proportioning the heat transmitted to the various portions of any goods being baked or toasted, whereby this heat may be controlled to provide for proper baking of the material.

Having therefore described my invention in accordance with the patent statutes, what I claim as new and intend to secure by Letters Patent is:

1. A table type of portable oven for baking biscuits and the like comprising a chamber having upper and lower complementary portions, said upper portion having an internal reflecting surface parabolic in right cross section and said lower portion having an internal reflecting surface elliptic in right cross section, closures for the ends of said portions, a rectangular tray for supporting the biscuits intermediate said upper and lower portions, said tray being formed of metal and having a width substantially less than the inner transverse dimension of said chamber, and an elongated heat generating element disposed along the focal axis of said lower portion so arranged and constructed as to radiate heat rays directly to the under surface of said tray and to indirectly radiate heat rays to the upper surface of said tray past the edges thereof by reflection from said reflecting surfaces for baking the biscuits.

2. A table type of portable oven for baking biscuits and the like comprising a chamber having upper and lower complementary portions, said upper portion having an internal reflecting surface parabolic in right cross section and said lower portion having an internal reflecting surface elliptic in right cross section, straight side walls depending from said upper portion, closures for the ends of said portions, a rectangular tray for supporting the biscuits intermediate said upper and lower portions, said tray being formed of metal and having a width substantially less than the inner transverse dimension of said chamber, a lateral opening in one of said side walls to permit insertion of said tray, and an elongated heat generating element disposed along the focal axis of said lower portion so arranged and constructed as to radiate heat rays directly to the under surface of said tray and to indirectly radiate heat rays to the upper surface of said tray past the edges thereof by reflection from said reflecting surfaces for baking the biscuits.

3. A table type of portable oven for baking biscuits and the like comprising a chamber having upper and lower complementary portions, said upper portion having an internal reflecting surface comprising a pair of centrally intersecting surfaces each being parabolic in right cross section and said lower portion having an internal reflecting surface in the form of a pair of centrally intersecting surfaces each being elliptic in right cross section the lower focal axes of which are coincident, the upper focal axes of said elliptic right sections being disposed in close proximity to the focal axes of said parabolic right sections, closures for the ends of said portions, a rectangular tray for supporting the biscuits intermediate said upper and lower portions, said tray being formed of metal and having a width substantially less than the inner transverse dimension of said chamber, and an elongated heat generating element disposed along said coincident focal axes so arranged and constructed as to radiate heat rays directly to the under surface of said tray and to indirectly radiate heat rays to the upper surface of said tray past the edges thereof by reflection from said reflecting surfaces for baking the biscuits.

4. A table type of portable oven for baking biscuits and the like comprising a chamber having upper and lower complementary portions, said upper portion having an internal reflecting surface in the form of a pair of centrally intersecting surfaces each being parabolic in right cross section and said lower portion having an internal reflecting surface in the form of a pair of centrally intersecting surfaces each being elliptic in right cross section the lower focal axes of which are coincident, the upper focal axes of said elliptic right sections being disposed in close proximity to the focal axes of said parabolic right sections, straight side walls depending from said upper portion, closures for the ends of said portions, a rectangular tray for supporting the biscuits intermediate said upper and lower portions, said tray being formed of metal and having a width substantially less than the inner transverse dimension of said chamber, a lateral opening in one of said side walls to permit insertion of said tray, and a tubular heat generating element having its longitudinal axis coincident with said coincident focal axes so arranged and constructed as to radiate heat rays directly to the under surface of said tray and to indirectly radiate heat rays to the upper surface of said tray past the edges thereof by reflection from said reflecting surfaces for baking the biscuits.

5. A table type of portable oven for baking biscuits and the like comprising a chamber having upper and lower complementary portions, said upper portion having an internal reflecting surface parabolic in right cross section and said lower portion having an internal reflecting surface elliptic in right cross section, a tray for supporting the biscuits intermediate said upper and lower portions, said tray being formed of metal and spaced from the walls of said chamber, and heat generating means disposed at the focal axis of said lower portion so arranged and constructed as to radiate heat rays directly to the under surface of said tray and to indirectly radiate heat rays to the upper surface of said tray past the edge thereof by reflection from said reflecting surfaces for baking the biscuits.

6. A table type of portable oven for baking biscuits and the like comprising a chamber having upper and lower complementary portions, said upper portion having an internal reflecting surface parabolic in right cross section and said lower portion having an internal reflecting surface elliptic in right cross section, one of said portions having a straight side wall portion adjacent the other portion, a tray for supporting the biscuits intermediate said upper and lower portions, said tray being formed of metal and spaced from the walls of said chamber, a lateral opening in said side wall portion to permit insertion of said tray, and a heat generating element disposed at the focal axis of said lower portion so arranged and constructed as to radiate heat rays directly to the under surface of said tray and to indirectly radiate heat rays to the upper surface of said tray past the edge thereof by reflection from said reflecting surfaces for baking the biscuits.

7. A table type of portable oven for baking biscuits and the like comprising a chamber having upper and lower complementary portions, said upper portion having an internal reflecting surface comprising a pair of centrally intersecting surfaces each being parabolic in right cross section and said lower portion having an internal reflecting surface in the form of a pair of centrally intersecting surfaces each being elliptic in right cross section the lower focal axes of which are coincident, the upper focal axes of said elliptic right sections being disposed in close proximity to the focal axes of said parabolic right sections, a tray for supporting the biscuits intermediate said upper and lower portions, said tray being formed of metal and spaced from the walls of said chamber, and heat generating means disposed at said coincident focal axes so arranged and constructed as to radiate heat rays directly to the under surface of said tray and to indirectly radiate heat rays to the upper surface of said tray past the edge thereof by reflection from said reflecting surfaces for baking the biscuits.

8. A table type of portable oven for baking biscuits and the like comprising a chamber having upper and lower complementary portions, said upper portion having an internal reflecting surface comprising a pair of centrally intersecting surfaces each being parabolic in right cross section and said lower portion having an internal reflecting surface in the form of a pair of centrally intersecting surfaces each being elliptic in right cross section the lower focal axes of which are coincident, the upper focal axes of said elliptic right sections being disposed in close proximity to the focal axes of said parabolic right sections, one of said portions having a straight side wall portion adjacent the other portion, a tray for supporting the biscuits intermediate said upper and lower portions, said tray being formed of metal and spaced from the walls of said chamber, a lateral opening in said side wall portion to permit insertion of said tray, and a heat generating element disposed at said coincident focal axes so arranged and constructed as to radiate heat rays directly to the under surface of said tray and to indirectly radiate heat rays to the upper surface of said trays past the edge thereof by reflection from said reflecting surfaces for baking the biscuits.

DURWIN D. GILLESPIE.